United States Patent
Chiu et al.

(10) Patent No.: US 8,472,210 B2
(45) Date of Patent: Jun. 25, 2013

(54) EXPANSION CARD MOUNTING ASSEMBLY

(75) Inventors: Po-Wen Chiu, Taipei Hsien (TW);
Zhan-Yang Li, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 296 days.

(21) Appl. No.: 12/979,087

(22) Filed: Dec. 27, 2010

(65) Prior Publication Data

US 2012/0020037 A1  Jan. 26, 2012

(30) Foreign Application Priority Data

Jul. 22, 2010  (CN) .......................... 2010 1 0233912

(51) Int. Cl.
*H05K 7/14* (2006.01)
*H05K 7/18* (2006.01)

(52) U.S. Cl.
USPC ............................ 361/801; 361/803; 361/752

(58) Field of Classification Search
USPC .............. 361/800–803, 752, 796, 728–730, 361/807, 809, 810
See application file for complete search history.

(56) References Cited

U.S. PATENT DOCUMENTS

| | | | | |
|---|---|---|---|---|
| 5,544,006 A | * | 8/1996 | Radloff et al. | 361/679.32 |
| 5,575,546 A | * | 11/1996 | Radloff | 312/183 |
| 6,118,668 A | * | 9/2000 | Scholder et al. | 361/753 |
| 6,215,668 B1 | * | 4/2001 | Hass et al. | 361/759 |
| 6,309,037 B2 | * | 10/2001 | Bertolami | 312/223.2 |
| 6,920,048 B2 | * | 7/2005 | Holt et al. | 361/726 |
| 6,972,370 B2 | * | 12/2005 | Wang et al. | 174/535 |
| 6,985,360 B2 | * | 1/2006 | Chen et al. | 361/704 |
| 7,113,407 B2 | * | 9/2006 | Holt et al. | 361/726 |
| 7,724,538 B2 | * | 5/2010 | Tsai et al. | 361/802 |
| 7,746,630 B2 | * | 6/2010 | Tsai et al. | 361/679.32 |
| 8,130,510 B2 | * | 3/2012 | Jang et al. | 361/784 |
| 2011/0310575 A1 | * | 12/2011 | Chiu et al. | 361/759 |

* cited by examiner

*Primary Examiner* — Hung S Bui
(74) *Attorney, Agent, or Firm* — Altis Law Group, Inc.

(57) ABSTRACT

A mounting assembly includes a mounting bracket, a riser card, a shield plate attached to an expansion card, a mounting frame, and a latch member. The riser card is attached to the mounting bracket and has at least one expansion card socket. The expansion card is received in the at least one expansion card socket. The mounting frame has at least one slot configured to fix the shield plate and an accommodating space beside the at least one slot. The latch member is mounted in the accommodating space and abuts the shield plate for preventing the expansion card from moving away from the at least one expansion card socket. The latch member is capable of being taken out from the accommodating space to release the shield plate, thereby allowing the expansion card to disengage from the at least one expansion card socket.

17 Claims, 5 Drawing Sheets

EXPANSION CARD MOUNTING ASSEMBLY

BACKGROUND

1. Technical Field

The present disclosure relates to mounting assemblies, more particularly to an expansion card mounting assembly.

2. Description of Related Art

In some computer systems, riser cards are connected perpendicular to motherboards of the computer systems. Expansion card sockets are mounted on the riser cards receiving corresponding expansion cards parallel to the motherboards. This arrangement can save space in the computer systems. After the expansion cards are received in the expansion card socket, the expansion cards are further secured to the chassis of the computer systems by securing means. However, such securing means often utilize fasteners or fasteners to secure the expansion cards, complicating installation and removal of the expansion cards.

Therefore, there is still room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
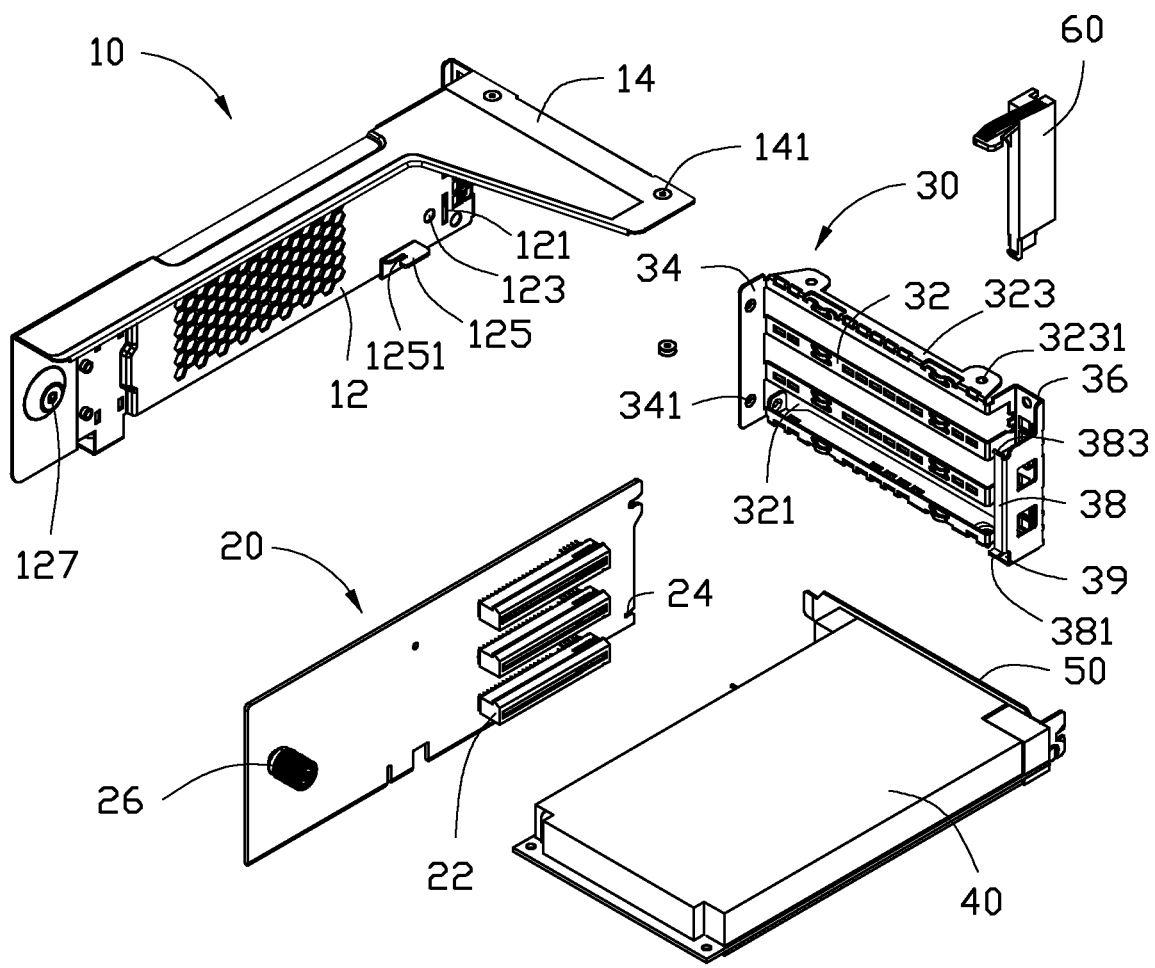
FIG. 1 is an isometric and exploded view of an expansion card mounting assembly in accordance with an embodiment.
Figure 2:
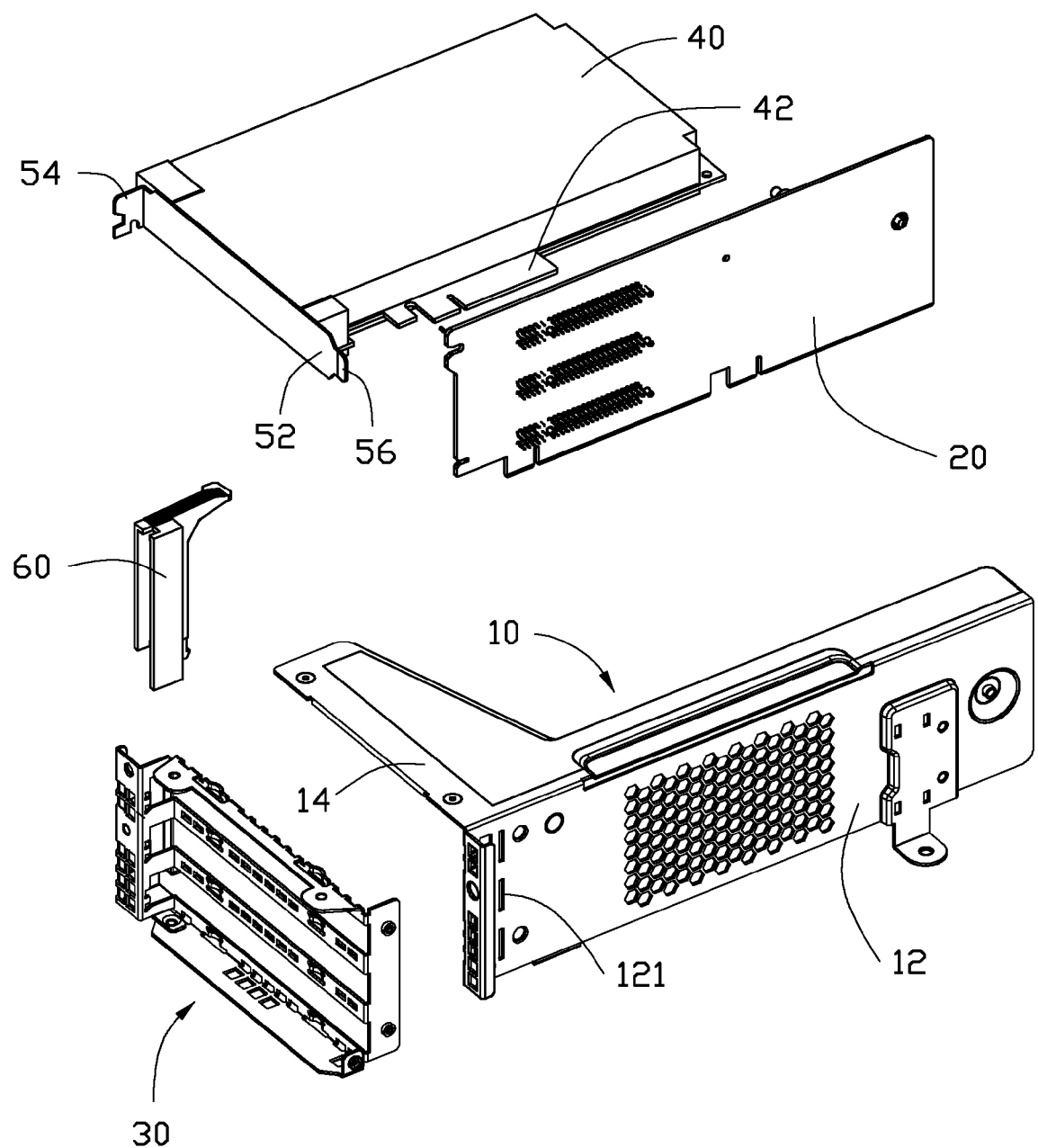
FIG. 2 is similar to FIG. 1, but viewed from another aspect.

Referring to FIGS. 1 and 2, an embodiment of an expansion card mounting assembly includes a mounting bracket 10, a riser card 20, a mounting frame 30, an expansion card 40, a shield plate 50 attached to a rear side of the expansion card 40, and a latch member 60.

The mounting bracket 10 includes a side panel 12 and a top panel 14 perpendicularly connected to a top edge of the side panel 12. A plurality of receiving slots 121 and a pair of first securing holes 123 are defined in the side panel 12 of the mounting bracket 10. A limiting piece 125 extends from the side panel 12 of the mounting bracket 10. A gap 1251 is defined in the limiting piece 125. A second securing hole 127 is defined in a curved inner surface of the side panel 12 of the mounting bracket 10. A pair of third securing holes 141 is defined in the top panel 14 of the mounting bracket 10.

A plurality of expansion card sockets 22 is mounted on the riser card 20. A fastener 26 is mounted to the riser card 20. A distal end of the fastener 26 can be mounted in the second securing hole 127 of the mounting bracket 10, A notch 24 defined in the riser card 20 fits into the gap 1251 of the mounting bracket 10.

The mounting frame 30 includes an L-shaped main body 32, a first side flange 34 extending from a side edge of the main body 32, and a second side flange 36 extending from another side edge of the main body 32. A plurality of L-shaped shots 321 is defined in the main body 32 of the mounting frame 30 for receiving the shield plate 50 of the expansion card 40. A top flange 323 extends from a top edge of the main body 32. A pair of fourth securing holes 3231 is defined in the top flange 323 corresponding to the third securing holes 141 of the mounting bracket 10. A pair of fifth securing holes 341 is defined in the first side flange 34 of the mounting frame 30 corresponding to the first securing holes 123 of the mounting bracket 10. The second side flange 36 has an L-shape. An accommodating space is formed between the main body 32 and the second side flange 36 for receiving the latch member 60. A rim 38 is formed on an edge of the second side flange 36. A stop piece 381 angles out from a lower end of the rim 38. A guiding piece 383 angles out from an upper end of the rim 38. A bottom flange 39 angles inwardly from a bottom edge of the second side flange 36 (also see FIG. 5).

The expansion card 40 includes connection piece 42 extending from a lower side thereof for receiving the expansion card socket 22 of the riser card 20 (see FIG. 2).

The shield plate 50 includes a longitudinal piece 52 and a resisting flange 54 angled from a distal end of the longitudinal piece 52. A tab 56 is formed at another distal end of the longitudinal piece 52 (see FIG. 2). The tab 56 is narrower than the longitudinal piece 52.

Figure 3:
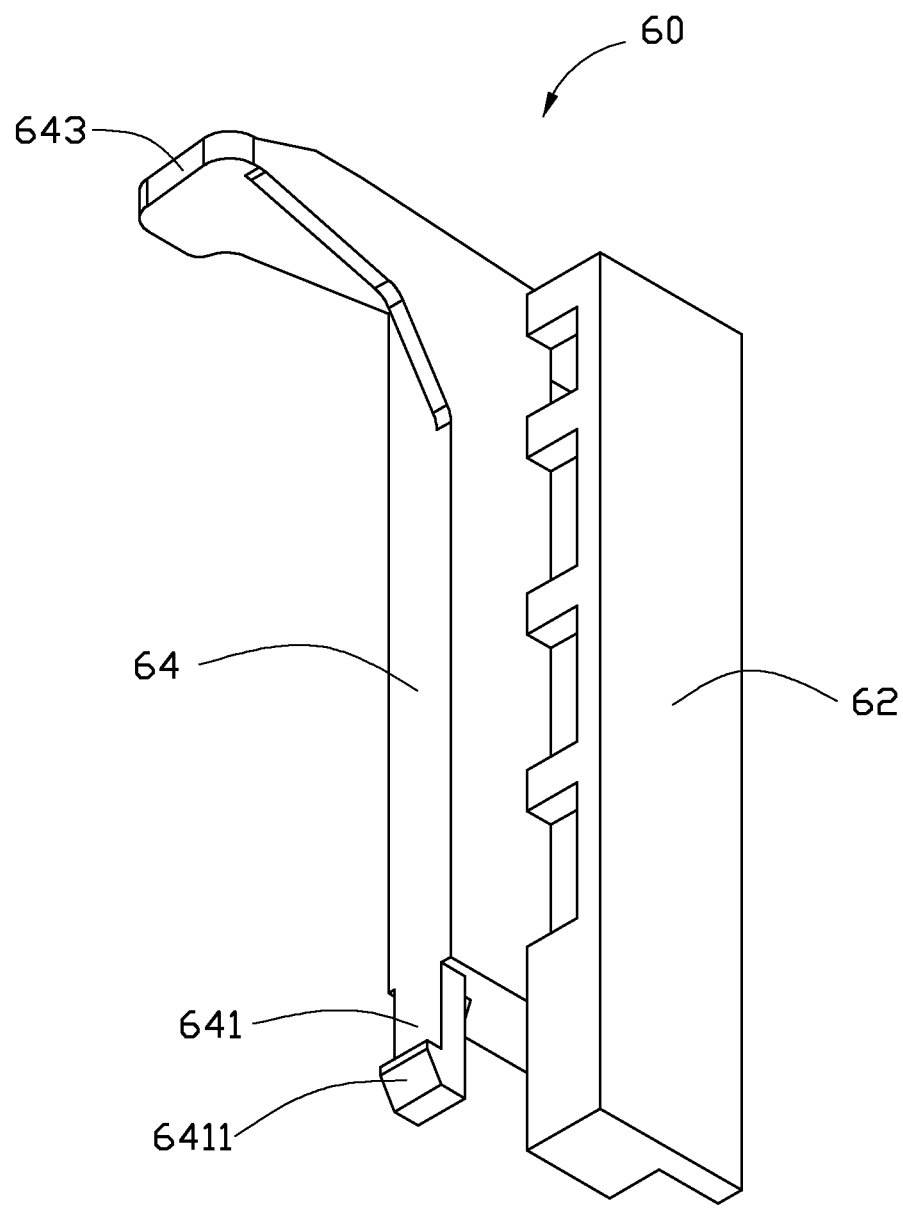
FIG. 3 is another view of a latch member in FIG. 1.

Referring to FIG. 3, the latch member 60 includes a first shaft 62 and a second shaft 64 connected to the first shaft 62. Each of the first shaft 62 and the second shaft 64 is approximately cuboid. A width of the first shaft 62 is less than that of the second shaft 64. The first shaft 62 is longer than the second shaft 64. A resilient leg 641 extends from a lower end the second shaft 64. A wedge-shaped hook 6411 is formed at a lower end of the resilient leg 641. A handle 643 is formed at an upper end of the second shaft 64.

Figure 4:
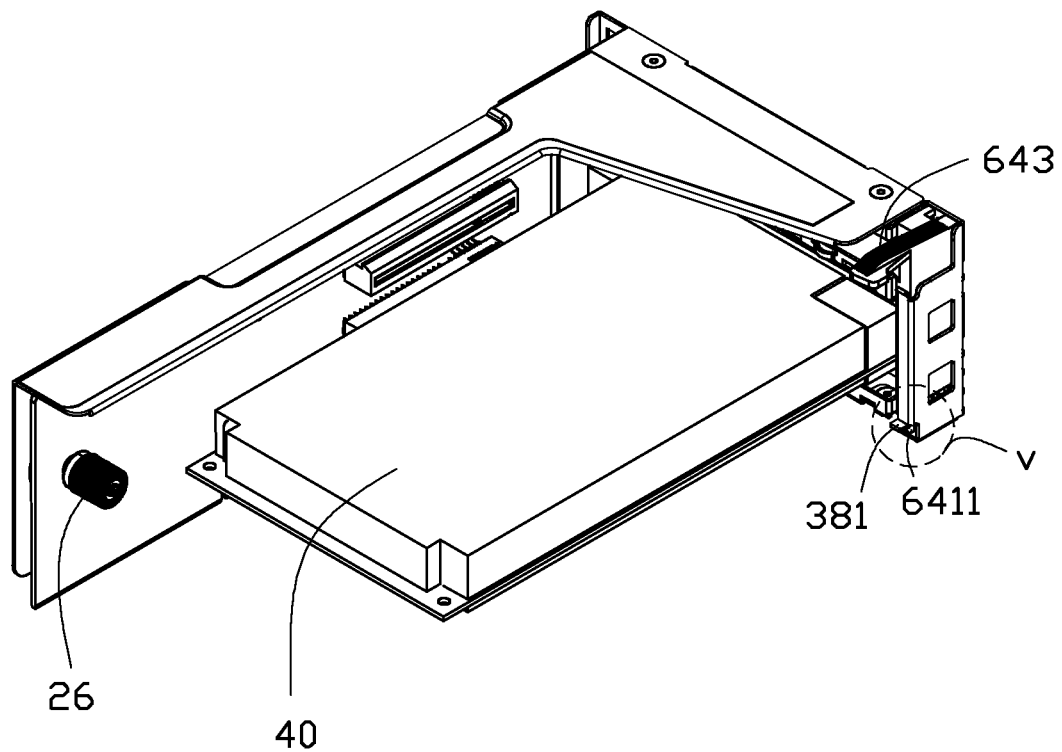
FIG. 4 is an assembled view of the expansion card mounting assembly of FIG. 1.
Figure 5:
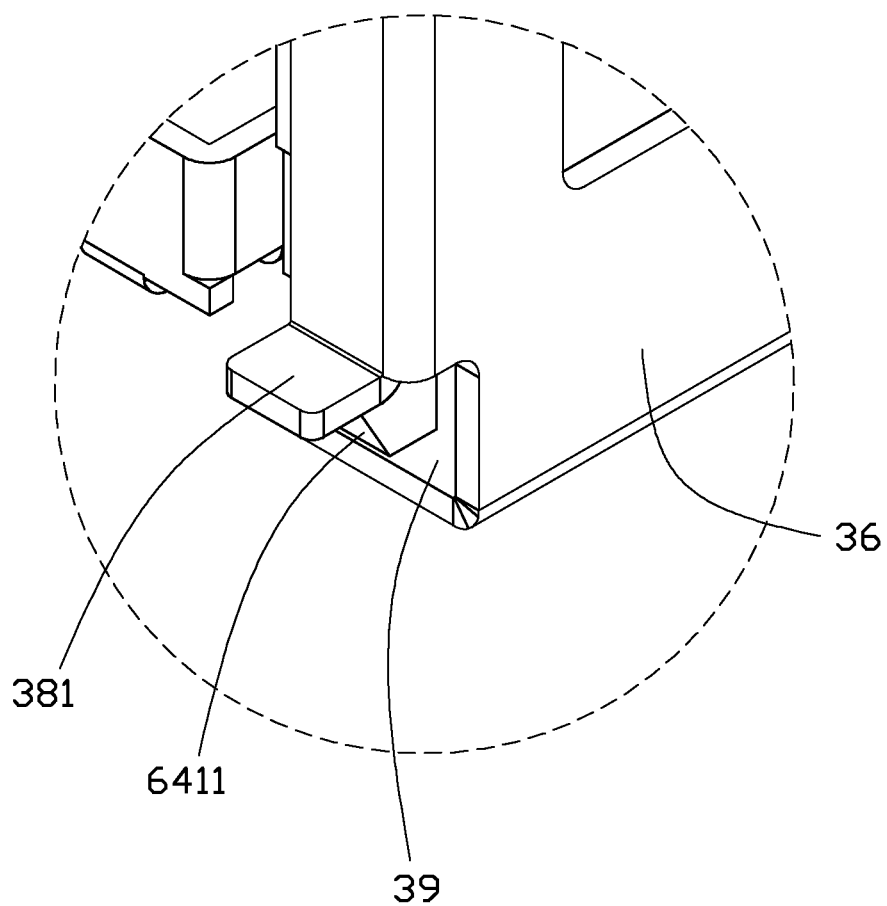
FIG. 5 is an enlarged view of a circled portion V of FIG. 4.

Referring to FIGS. 4 and 5, in assembly, the first side flange 34 of the mounting frame 30 abuts the inner side of the side panel 12 of the mounting bracket 10. The fifth securing holes 341 of the mounting frame 30 are aligned with the first securing holes 123 of the mounting bracket 10. The fourth securing holes 3231 of the mounting frame 30 are aligned with third securing holes 141 of the top panel 14 of the mounting bracket 10. Then fasteners are received in the securing holes (123 and 341, 141 and 3231) for securing the mounting frame 30 to the mounting bracket 10. The notch 24 of the riser card 20 is received in the gap 1251 of the limiting piece 125 of the mounting bracket 10 preventing the riser card 20 from moving. The distal end of the fastener 26 is secured in the securing hole 127 of the mounting bracket 10. Thus, the riser card 20 is secured to the inner side of the side panel 12 of the mounting bracket 10. The connection pieces 42 of the expansion card 40 are received in one of the expansion card sockets 22 of the riser card 20 perpendicular to the riser card 20. The shield plate 50 is mounted in one of the slots 321 of the mounting frame 30. The tab 56 is received in one of the receiving slots 121 of the mounting bracket 10. The hook 6411 of the latch member 60 is received in the accommodating space of the mounting frame 30 along the guiding piece 383. The resilient leg 641 of the latch member 60 is deformed until the latch member 60 slides to a final position. In the final position, the resilient leg 641 of the latch member 60 returns to a relaxed state and the hook 6411 contacts a lower side of the stop piece 381 of the mounting frame 30. The second shaft 64 of the latch member 60 abuts the bottom flange 39 of the mounting frame 30. The first shaft 62 of the latch member 60 abuts the resisting flange 54 of the shield plate 50 and prevents the expansion card 40 from moving away from the expansion card socket 22 of the riser card 20. Thus, the expansion card 40 is secured to the riser card 20.

During the detachment of the expansion card 40 from the riser card 20, the distal end of the resilient leg 641 is pressed to release the hook 6411 from the stop piece 381 of the mounting frame 30. The handle 643 of the latch member 60 is pulled upwards to withdraw the latch member 60 from the mounting frame 30. The shield plate 50 of the expansion card 40 is released, and the expansion card 40 moves horizontally to disengage from the expansion card socket 22 of the riser card 20.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A mounting assembly comprising:
    a mounting bracket;
    a riser card attached to an inner side of the mounting bracket, the riser card comprising at least one expansion card socket configured to receive an expansion card;
    a shield plate configured to secure the expansion card;
    a mounting frame having at least one slot configured to mount the shield plate and an accommodating space beside the at least one slot, the at least one slot extending in a first direction, the mounting frame comprising a stop piece; and
    a latch member configured to secure the expansion card, the latch member mounted in the accommodating space in a second direction perpendicular to the first direction and abutting the shield plate for preventing the expansion card from moving away from the at least one expansion card socket in the first direction, and the latch member capable of being taken out from the accommodating space to release the shield plate, thereby allowing the expansion card to disengage from the at least one expansion card socket, the latch member comprising a resilient leg and a hook formed at a lower end of the resilient leg, and the hook received in the stop piece for preventing the latch member moving away from the accommodating space.

2. The mounting assembly of claim 1, wherein the mounting frame comprises a main body, a first side flange extending from a side edge of the main body, and a second side flange extending from another side edge of the main body; and the first side flange is attached to the inner side of the mounting bracket.

3. The mounting assembly of claim 2, wherein a rim extends from an outer edge of the second side flange, the stop piece extends perpendicularly from a bottom of the rim, and a guiding piece extends obliquely from a top of the rim for guiding sliding movement of the hook into the accommodating space.

4. The mounting assembly of claim 2, wherein the main body has an L-shape, and the at least one slot is defined in the main body and has an L-shape.

5. The mounting assembly of claim 4, wherein the second side flange has an L-shape, and the accommodating space is located between the main body and the second side flange.

6. The mounting assembly of claim 1, wherein a handle is located at a top portion of the latch member.

7. The mounting assembly of claim 1, wherein the mounting bracket comprises a side panel and a top panel connected to a top edge of the side panel, and the top panel is perpendicular to the side panel.

8. The mounting assembly of claim 7, wherein the riser card is secured to the side panel, and the expansion card is perpendicular to the riser card.

9. The mounting assembly of claim 8, wherein at least one receiving slot is defined in the side panel, and a distal end of the shield plate is engaged in the at least one receiving slot.

10. A mounting assembly comprising:
    a mounting bracket;
    a mounting frame secured to the mounting bracket;
    a riser card attached to an inner side of the mounting bracket, the riser card comprising at least one expansion card socket configured to receive an expansion card;
    a shield plate, configured to secure the expansion card, mounted to the mounting frame; and
    a latch member, attached to the mounting frame, abutting the shield plate for preventing the expansion card moving away from the at least one expansion card socket, and the latch member capable of being detached from the mounting frame to release the shield plate, thereby allowing the expansion card to disengage from the at least one expansion card socket;
    wherein the mounting frame comprises a stop piece, the latch member comprises a resilient leg and a hook formed at a lower end of the resilient leg, and the hook is received in the stop piece for preventing the latch member from disengaging from the mounting frame.

11. The mounting assembly of claim 10, wherein the mounting frame comprises a main body, a first side flange extending from a side edge of the main body, and a second side flange extending from another side edge of the main body; and the first side flange is attached to the inner side of the mounting bracket.

12. The mounting assembly of claim 11, wherein a rim extends from an outer edge of the second side flange, the stop piece extends perpendicularly from a bottom of the rim, and a guiding piece extends from a top of the rim for guiding sliding movement of the hook.

13. The mounting assembly of claim 11, wherein the main body has an L-shape, and at least one slot is defined in the main body and has an L-shape.

14. The mounting assembly of claim 13, wherein the second side flange has an L-shape, an accommodating space is located between the main body and the second side flange, and the latch member is received in the accommodating space and abuts the shield plate.

15. The mounting assembly of claim 10, wherein a handle is located at a top portion of the latch member.

16. The mounting assembly of claim 10, wherein the mounting bracket comprises a side panel and a top panel connected to a top edge of the side panel, and the top panel is perpendicular to the side panel.

17. The mounting assembly of claim 16, wherein at least one receiving slot is defined in the side panel, and a distal end of the shield plate is engaged in the at least one receiving slot.

* * * * *